US005978824A

United States Patent [19]
Ikeda

[11] Patent Number: 5,978,824
[45] Date of Patent: Nov. 2, 1999

[54] NOISE CANCELER

[75] Inventor: Shigeji Ikeda, Tokyo, Japan

[73] Assignee: NEC Corporation, Tokyo, Japan

[21] Appl. No.: 09/015,525

[22] Filed: Jan. 29, 1998

[30] Foreign Application Priority Data

Jan. 29, 1997 [JP] Japan .................................... 9-014410

[51] Int. Cl.[6] ........................................ G06F 17/10
[52] U.S. Cl. ........................................ 708/322
[58] Field of Search .................................... 708/322–323; 375/232–233; 381/71.12

[56] References Cited

U.S. PATENT DOCUMENTS

| | | | |
|---|---|---|---|
| 4,649,505 | 3/1987 | Zinser, Jr. et al. | 708/322 |
| 5,278,780 | 1/1994 | Eguchi | 708/322 |
| 5,608,804 | 3/1997 | Hirano | 708/322 |
| 5,644,596 | 7/1997 | Sih | 708/322 |

FOREIGN PATENT DOCUMENTS

| | | |
|---|---|---|
| 0 661 832 | 7/1995 | European Pat. Off. . |
| 0 730 262 | 9/1996 | European Pat. Off. . |
| 0 751 619 | 1/1997 | European Pat. Off. . |
| 8-56180 | 2/1996 | Japan . |

OTHER PUBLICATIONS

Jin–ichi Nagumo, et al., "A Learning Method for System Identification", *IEEE Transaction On Automatic Control*, vol. 12, No. 3, pp. 282–287, Jun. 1967.

Bernard Widrow, et al., "Adaptive Noise Cancelling: Principles and Applications", *Proceedings of the IEEE*, pp. 1692–1716, Dec. 1975.

*Primary Examiner*—Tan V. Mai
*Attorney, Agent, or Firm*—Foley & Lardner

[57] ABSTRACT

A noise canceler of the present invention includes a signal-to-noise power ratio estimator to which a main signal and a reference signal are input. The estimator 10 estimates the sinal-to-noise power ratio of the main signal from the mean power of a desired signal contained in the main siganl and a mean power of a noise signal also contained in the main signal. In addition, the estimator estimates the signal-to-noise power ratio of the reference signal from the mean power of a desired signal contained in the reference signal and the mean power of a noise singal also contained in the reference signal. An adptive filter for estimating the noise signal of the main signal has its step size for coefficient updating controlled in accordance with the estimated signal-to-noise power ratio of the noise signal. On the other hand, an adptive filter for estimating the desired signal of the reference signal has its step size for coefficient updating controlled in accordance with the estimated signal-to-noise power ratio of the reference signal. Delay circuits are provided for compensating for a delay ascribable to a power averaging procedure which a signal-to-noise power ratio estimator executes to calculate the estimated siganl-to-noise power ratios.

6 Claims, 6 Drawing Sheets

NOISE CANCELER

BACKGROUND OF THE INVENTION

The present invention relates to a noise canceler and, more particularly, to a noise canceler for canceling, by use of an adaptive filter, a background noise signal introduced into a speech signal input via a microphone, a handset or the like.

A background noise signal introduced into a speech signal input via, e g., a microphone or a handset is a critical problem when it comes to a narrow band speech coder, speech recognition device and so forth which compress information to a high degree. Noise cancelers for canceling such acoustically superposed noise components include a biinput noise canceler using an adaptive filter and taught in B. Widrow et al. "Adaptive Noise Cancelling: Principles and Applications", PROCEEDINGS OF IEEE, VOL. 63, NO. 12, DECEMBER 1975, pp. 1692–1716 (Document 1 hereinafter).

The noise canceler taught in Document 1 includes an adaptive filter for approximating the impulse response of a noise path along which a noise signal input to a microphone assigned to a reference signal (reference signal microphone hereinafter) to propagate toward a microphone assigned to a main signal (main signal microphone hereinafter). The adaptive filter is capable estimating noise introduced into the main signal microphone. The estimated noise signal is subtracted from a main signal (combination of a desired signal and a noise signal) input to the main signal microphone.

The filter coefficient of the above adaptive filter is corrected by determining a correlation between an error signal produced by subtracting the estimated noise signal from the main signal and a reference signal derived from the reference signal microphone. Typical of an algorithm for such coefficient correction, i.e., a convergence algorithm is "LMS algorithm" describe in Document 1 or "LIM (Learning Identification Method) algorithm" described in EEE TRANSACTIONS ON AUTOMATIC CONTROL, VOL. 12, NO. 3, 1967, pp. 282–287.

A conventional noise cancellation principle will be described with reference to FIG. 5. As shown, a noise canceler includes a main signal microphone 1, a reference signal microphone 2, an adaptive filter 3, a subtracter 4, and an output terminal 5. A desired signal S(z) spoken by a speaker (signal source) is input to the main signal microphone 1 adjoining the speaker's mouth by way of a path having an acoustic transfer characteristic HA(z); z is expressed as:

$$z=\exp(2\alpha j/FS) \qquad \text{Eq. (1)}$$

where FG denotes a sampling frequency.

On the other hand, noise N(z) issuing from a noise source is input to the main signal microphone 1 via a path having an acoustic transfer characteristic GA(z). At the same time, the noise N(z) is input to a reference signal microphone 2 remote from the speaker by way of a path having an acoustic transfer characteristic GB(z). The adaptive filter 3 estimates, based on the main signal XA(z) and reference signal XB(z), the acoustic transfer characteristic (noise path) P(z) of an acoustic path along which noise output from the noise source N(z) and then input to the reference signal microphone 2 will propagate to the main signal microphone 1 when the desired signal S(z) is not input.

The acoustic transfer characteristic P(z) to be estimated is produced by:

$$P(z)=GA(z)/GB(z) \qquad \text{Eq. (2)}$$

The adaptive filter 3 therefore constitutes a filter having a transfer characteristic W1(z) identical with the transfer function P(z) and operates to generate an estimated noise signal F1(z) identical with the noise signal contained in the main signal. The subtracter 4 subtracts the estimated noise signal F1(z) output from the filter 3 from the main signal XA(z), thereby producing an output E1(z). When the desired signal S(z) is not input, the output signal E1(z) is expressed as:

$$\begin{aligned} E1(z) &= XA(z) - F1(z) \\ &= XA(z) - W1(z)XB(z) \\ &= GA(z)N(z) - W1(z)GB(z)N(z) \\ &= GA(z)N(z) - \{GA(z)/GB(z)\}gb(z)N(z) \\ &= 0 \end{aligned} \qquad \text{Eq. (3)}$$

In this manner, the adaptive filter 3 is capable of estimating the acoustic transfer characteristic P(z) by updating the coefficient such that the output signal E1(z) is zero when the desired signal S(z) is not contained. The output signal E1(z) is referred to as an error signal because it is representative of an error in the learning operation of the adaptive filter.

After the convergence of the adaptive filter 3 the output signal E1(z) is expressed as:

$$\begin{aligned} E1(z) &= XA(z) - F1(z) \\ &= XA(z) - W1(z)XB(z) \\ &= GA(z)N(z) + HA(z)S(z) - W1(z)GB(z)N(z) + HB(z)S(z) \\ &= GA(z)N(z) + HA(z)S(z) - W1(z)GB(z)N(z) - W1(z)HB(z)S(z) \\ &= HA(z)S(z) - W1(z)HB(z)S(z) \\ &= HA(z)S(z)[1 - \{HB(z)/HA(z)\}W1(z)] \end{aligned} \qquad \text{Eq. (4)}$$

As the Eq. (4) indicates, the output signal E1(z) does not contain any noise signal N(z), i.e., noise has been canceled. However, the problem is that when the reference signal microphone 2 contains the desired signal component S(z), i.e., when the acoustic transfer characteristic HB(z) from the desired signal S(z) to the reference signal microphone 2 is not zero, a signal distortion represented by [1−{HB(z)/HA(z)}W1(z)] occurs.

To solve the above problem, an adaptive filter for correcting the signal distortion contained in the output signal S1(z) may be added, as taught in Japanese Patent Laid-Open Publication No. 8–56180. FIG. 6 shows a noise canceler including such an additional adaptive filter. As shown, the noise canceler has an adaptive filter 6 for the above correction and a subtracter 7 in addition to the structural elements shown in FIG. 5. When the main signal XA(z) contains the desired signal S(z) and if noise is absent is of less than certain level, the adaptive filter 6 performs learning such that the output E2(x) of the substracter 7 decreases. Assuming that the adaptive filter 6 has a transfer characteristic W2(z), then the filter 6 performs the above learning based on, e.g., the LIM scheme such that when N(z) is zero or negligible, E2(z) has the following value:

$$E2(z) = XA(z) - F2(z) \quad \text{Eq. (5)}$$
$$= XA(z) - W2(z)E1(z)$$
$$= HA(z)S(z) - W2(z)HA(z)S(z)[1 - \{HB(z)/HA(z)\}W1(z)]$$
$$= HA(z)S(z) - W2(z)HA(z)S(z) + W2(z)S(z)HB(z)W1(z)$$
$$= W2(z)S(z)HB(z)W1(z) - HA(z) + HA(z)S(z)$$
$$= 0$$

Therefore, the transfer characteristic W2(z) of the adaptive filter 6 is produced by:

$$W2(z) = HA(z)/\{HA(z) - HB(z)W1(z)\} \quad \text{Eq. (6)}$$
$$= 1/[1 - \{HB(z)/HA(z)\}W1(z)]$$

The output F2(z) of the adaptive filter 6 derived from the learning is expressed as:

$$F2(z) = W2(z)E1(z) \quad \text{Eq. (7)}$$
$$= \{1/[1 - \{HB(z)/HA(z)\}W1(z)]\}$$
$$HA(z)S(z)[1 - HB(z)/HA(z)\}W1(z)]$$
$$= HA(z)S(z)$$

As a result, a desired signal HA(z)S(z) free from signal distortion is output.

As stated above, the conventional noise canceler updates the coefficient of the adaptive filter 3 and learns the acoustic characteristic of noise in sections where the noise signal N(z) is present and the desired signal component S(z) is absent or negligibly small. Further, the noise canceler updates the coefficient of the adaptive filter 4 and learns a signal distortion correction filter in sections where the desired signal component S(z) is present and the noise component N(z) is absent or negligibly small. It is therefore necessary to detect the above sections where the desired signal component S(z) is absent (or little) and the sections where the noise signal component N(z) is absent (or little) and to command the adaptive filters to perform leaning in such sections from the outside.

However, it is, in many cases, difficult to command the adaptive filters to perform learning from the outside in accordance with the level of the desired signal and that of the noise signal, depending on the situation in which the noise canceler is located. With the conventional noise canceler, a sufficient noise canceling ability and a sufficient distortion correction characteristic are not achievable unless adequate learning sections are indicated to each adaptive filter for the learning purpose.

SUMMARY OF THE INVENTION

It is therefore an object of the present invention to provide a noise canceler capable of achieving a sufficient noise canceling ability and reducing signal distortion even when adequate learning sections cannot be indicated from the outside.

A noise canceler of the present invention includes a first delay circuit for delaying a main signal containing a desired signal and a noise signal by a preselected period of time to thereby output a delayed main signal. A second delay circuit receives the noise signal as a reference signal and delaying it by the preselected period of time to thereby output a delayed reference signal. A first subtracter subtracts a first estimated noise signal from the delayed main signal to thereby generate a first desired signal output. A second subtracter subtracts a first estimated desired signal from the delayed reference signal to thereby generate a first noise signal output. A first adaptive filter receives the first noise signal output and adaptively estimates a noise signal contained in the delayed main signal to thereby output the first estimated noise signal. A second adaptive filter receives the first desired signal output and adaptively estimating a desired signal contained in the delayed reference singal to thereby output the first estimated desired signal. A signal-to-noise power ratio estimator receives the main signal and reference signal and calculates desired signal power and noise signal power of the main signal and desired signal power and noise signal power of the reference signal to thereby output an estimated value of a power ratio of the main signal to the noise signal and an estimated value of a power ratio of the reference signal to the noise signal. A step size output circuit receives the estimated values from the signal-to-noise power ratio estimator to thereby output a first and a second step size representative of an amount of correction of a filter coefficient of the first adaptive filter and an amount of correction of a filter coefficient of the second adaptive filter, respectively.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
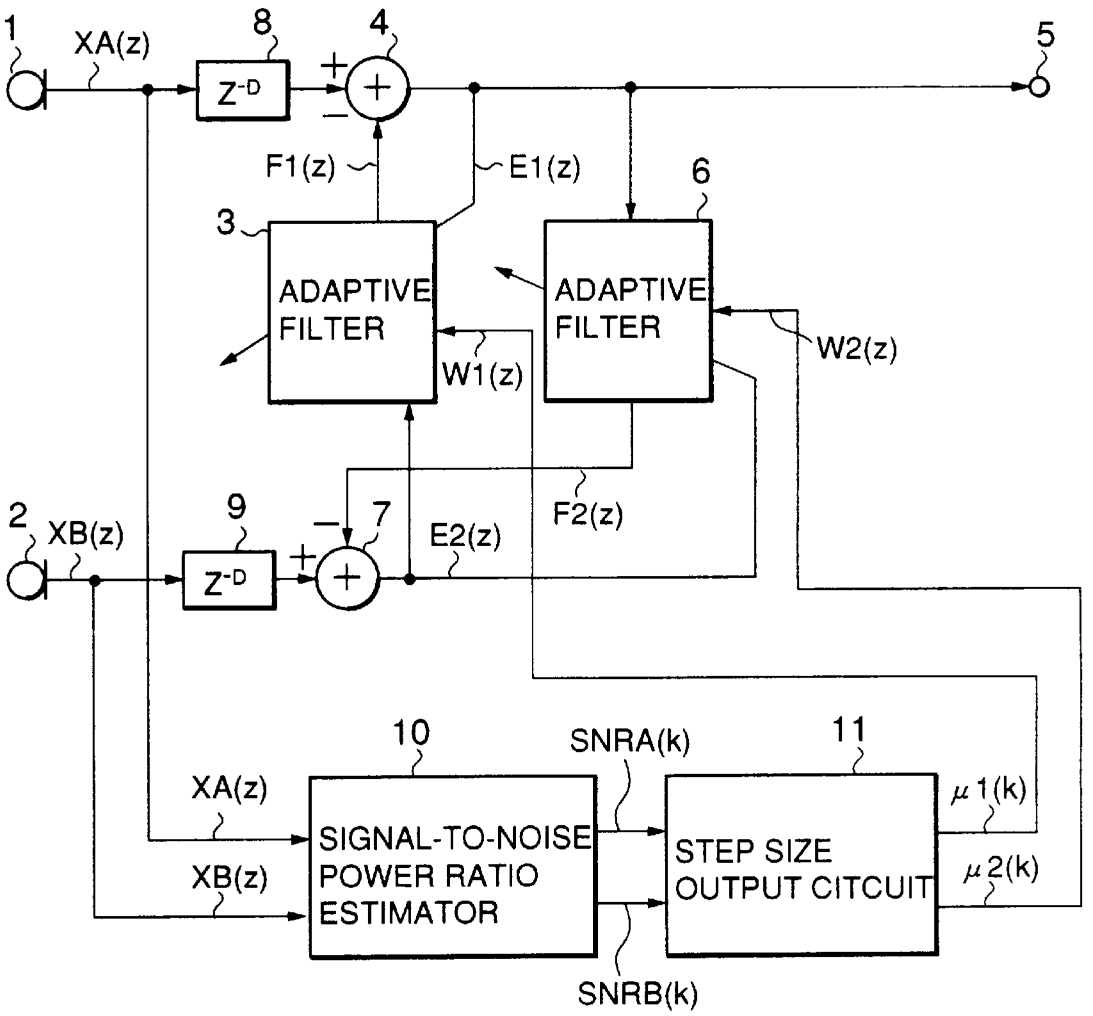
FIG. 1 is a block diagram schematically showing a noise canceler embodying the present invention.

Referring to FIG. 1 of the drawings, a noise canceler embodying the present invention is shown. As shown, the noise canceler includes a first microphone 1 for a main signal, a second microphone 2 for a reference signal, an output terminal 5, adaptive filters 3 and 6, subtracters 4 and 7, delay circuits 8 and 9, a signal-to-noise power ratio estimator 10, and a step size output circuit 11. The operation of the adaptive filters 3 and 6 will be described first.

A main signal XA(z) is delayed by the delay circuit 8 by D samples to turn out a delayed main signal $XA(z)Z^{-D}$ where $Z^{-D}$ denotes a delay by D samples. The signal $XA(Z)Z^{-D}$ is applied to the subtracter 4. On the other hand, a reference signal XB(z) is delayed by the delay circuit 9 by D samples to turn out a delayed reference signal $XB(z)Z^{-D}$ and then applied to the subtracter 7. The delay by D samples compensates for a delay ascribable to the calculation of a signal-to-noise power ratio to be effected by the signal-to-noise power estimator 10, as will be described later specifically. Because the delays provided at the main signal side of the adaptive filter 3 and the reference signal side of the adaptive filter 6, respectively, are equal, they have no influence on the relation between the main signal and the reference signal. Therefore, let D be assumed to be zero hereinafter.

The adaptive filter 3 operates to estimate a noise signal included in the main signal XA(z) while the adaptive filter 6 operates to estimate a desired signal included in the reference signal XB(z). To allow the filter 3 to estimate the noise signal, the desired signal estimated by the filter 6 is subtracted from the reference signal by the subtracter 7, and the resulting noise signal is input to the filter 3. Likewise, the noise signal estimated by the filter 3 is subtracted from the main signal, and the resulting desired signal is input to the filter 6. For this purpose, the two filters 3 and 6 are cross-coupled, as illustrated.

Assume that the subtracters 4 and 7 produce output signals E1(z) and E2(z), respectively, that the adaptive filter 3 has a transfer characteristic W1(z) and produces an output F1(z), and that the adaptive filter 6 has a transfer characteristic W2(z) and produces an output F2(z). Then, E1(z) and E2(z) are expressed as:

$$\begin{aligned} E1(z) &= XA(z) - F1(z) \\ &= XA(z) - W1(z)E2(z) \end{aligned} \qquad \text{Eq. (8)}$$

$$\begin{aligned} E2(z) &= XB(z) - F2(z) \\ &= XB(z) - W2(z)E1(z) \end{aligned} \qquad \text{Eq. (9)}$$

Figure 5:
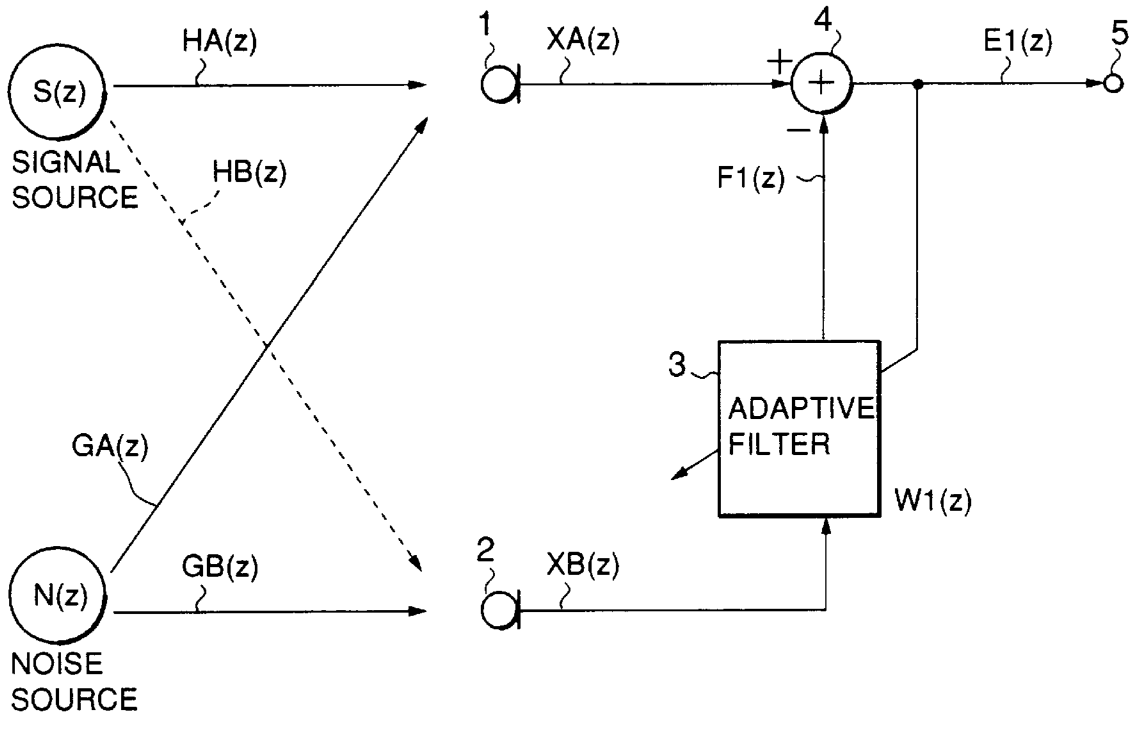
Fig.5 (Prior Art)
FIG. 5 shows the principle of a conventional noise canceler.
Figure 6:
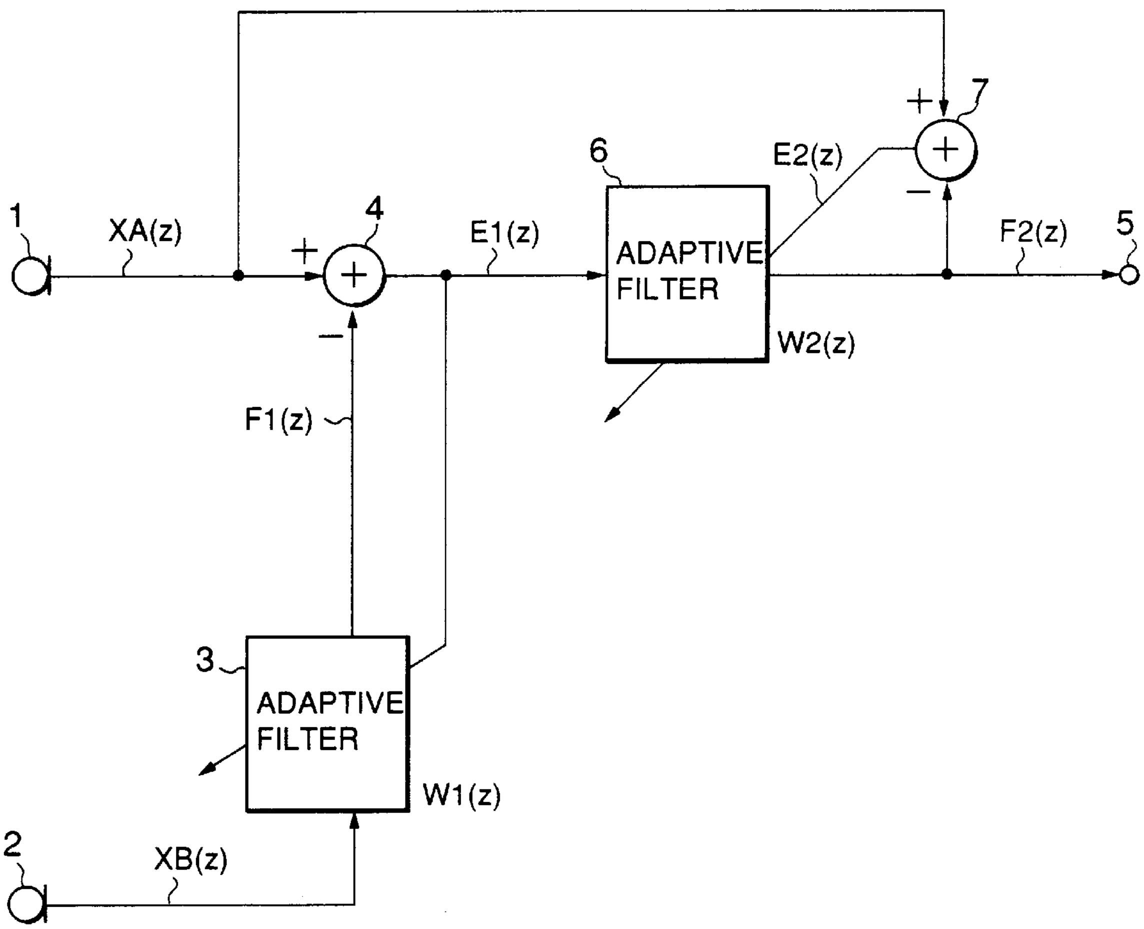
Fig.6 (Prior Art)
FIG. 6 is a block diagram schematically showing a specific configuration of a conventional noise canceler.

By using the desired signal S(z), noise N(z) and acoustic transfer characteristics HA(z), HB(z) and GB(z) described with reference to FIG. 5, the main signal XA(z) and reference signal XB(z) are produced by:

$$XA(z)=GA(z)N(z)+HA(z)S(z) \qquad \text{Eq. (10)}$$

$$XB(z)=GB(z)N(z)+HB(z)S(z) \qquad \text{Eq. (11)}$$

The above equations give El (z) and E2(z), as follows:

$$\begin{aligned} E1(z) = {} & [1/\{1 - W1(z)W2(z)\}]\{HA(z) - \\ & W1(z)HB(z)\}S(z) + \\ & [1/\{1 - W1(z)W2(z)\}]\{GA(z) - \\ & W1(z)GB(z)\}N(z) \end{aligned} \qquad \text{Eq. (12)}$$

$$\begin{aligned} E2(z) = {} & [1/\{1 - W1(z)W2(z)\}]\{HB(z) - \\ & W1(z)HA(z)\}S(z) + \\ & [1/\{1 - W1(z)W2(z)\}]\{GB(z) - \\ & W1(z)GA(z)\}N(z) \end{aligned} \qquad \text{Eq. (13)}$$

Therefore, if the following equations are satisfied:

$$W1(z)=GA(z)/GB(z) \qquad \text{Eq. (14)}$$

$$W2(z)=HB(z)/HA(z) \qquad \text{Eq. (15)}$$

then, there hold:

$$E1(z)=S(z) \qquad \text{Eq. (16)}$$

$$E2(z)=N(z) \qquad \text{Eq. (17)}$$

As a result, the output E1(z) of the subtracter 4 is the desired signal from which noise has been cancelled.

Now, for the adaptive filter 3 to estimate a noise signal contained in the main signal accurately, it is necessary to increase the amount of updating of the filter coefficient when the desired signal of the main signal obstructing the estimation is smaller than the noise signal to be estimated. Conversely, when the desired signal of the main signal is greater than the noise signal, it is necessary to reduce the above amount because the signal obstructing the estimation is greater than the noise signal.

On the other hand, for the adaptive filter 6 to estimate the desired signal of the reference signal accurately, it is necessary to increase the amount of updating of the filter coefficient when the noise signal contained in the reference signal obstructing the estimation is smaller than the desired signal. Conversely, when the noise signal of the reference signal is greater than the desired signal, it is necessary to reduce the above amount because the signal obstructing the estimation is greater than the desired signal.

The coefficient of each adaptive filter can be controlled to meet the above requirement if the step size of the learning algorithm of the filter is controlled, as follows.

A method of updating the coefficient will be described, assuming the LIM scheme as a learning algorithm and the adaptive filter 3 by way of example. Assume that the main signal XA(z)is denoted by xa(k) in time domain, that E2(z) input to the filter 3 is denoted by e2(k) in time domain, that F1(z) output from the filter 3 is denoted by f1(k) in time domain, and that E1(z) output from the subtracter 4 is denoted by e1(k) in time domain; k is an index representative of time.

Assuming that the j-th coefficient of the filter 3 at a time k is w1j(k), then an estimated noise signal f1(k) output from the filter 3 is expressed as:

$$f1(k) = \sum_{j=0}^{N-1} \omega 1j(k) \cdot e2(k-j) \qquad \text{Eq. (18)}$$

where N denotes the number of taps of the filter 3.

A coefficient w1j(k+1) at a time (k+1) is produced on the basis of an error signal e1(k) determined by the subtracter 4:

$$\omega 1j(k+1) = \omega 1j(k) + \frac{\mu 1(k) \cdot e1(k) \cdot e2(k-j)}{\sum_{m=0}^{N-1} e2(k-m)^2} \qquad \text{Eq. (19)}$$

where $\mu$1(k) is the step size for updating the coefficient of the filter 3.

A greater step size $\mu$1(k) promotes rapid convergence because the coefficient is corrected by a greater amount. However, when components obstructing the updating of the coefficient are present, the greater amount of updating is noticeably influenced by such components and increases the residual error. Conversely, a smaller stepwise $\mu$1(k) reduces the influence of the above obstructing components and therefore the residual error although it increases the converging time. It follows that a trade-off exists between the "converging time" and the "residual error" in the setting of the step size.

Likewise, as for the filter 6, assume that the reference signal XB(z)is denoted by xb(k) in time domain, that E1(z) input to the filter 6 is denoted by e1(k) in time domain, that F2(z) output from the filter 6 is denoted by f2(k) in time domain, and that E2(z) output from the substracter 7 is denoted by e2(k) in time domain. Then, an estimated noise signal f2(k) output from the filter 6 is expressed as:

$$f2(k) = \sum_{j=0}^{N-1} \omega 2j(k) \cdot e1(k-j) \quad \text{Eq. (20)}$$

A coefficient w2j(k+1) at the time (k+1) is produced on the basis of an error signal e2(k) determined by the subtracter 7:

$$\omega 2j(k+1) = \omega 2j(k) + \frac{\mu 2(k) \cdot e2(k) \cdot e1(k-j)}{\sum_{m=0}^{N-1} e2(k-m)^2} \quad \text{Eq. (21)}$$

where $\mu 2(k)$ is the step size for updating the coefficient of the filter 6.

As stated above, the coefficient can be variably controlled by controlling the step size of the adaptive filter.

Figure 2:
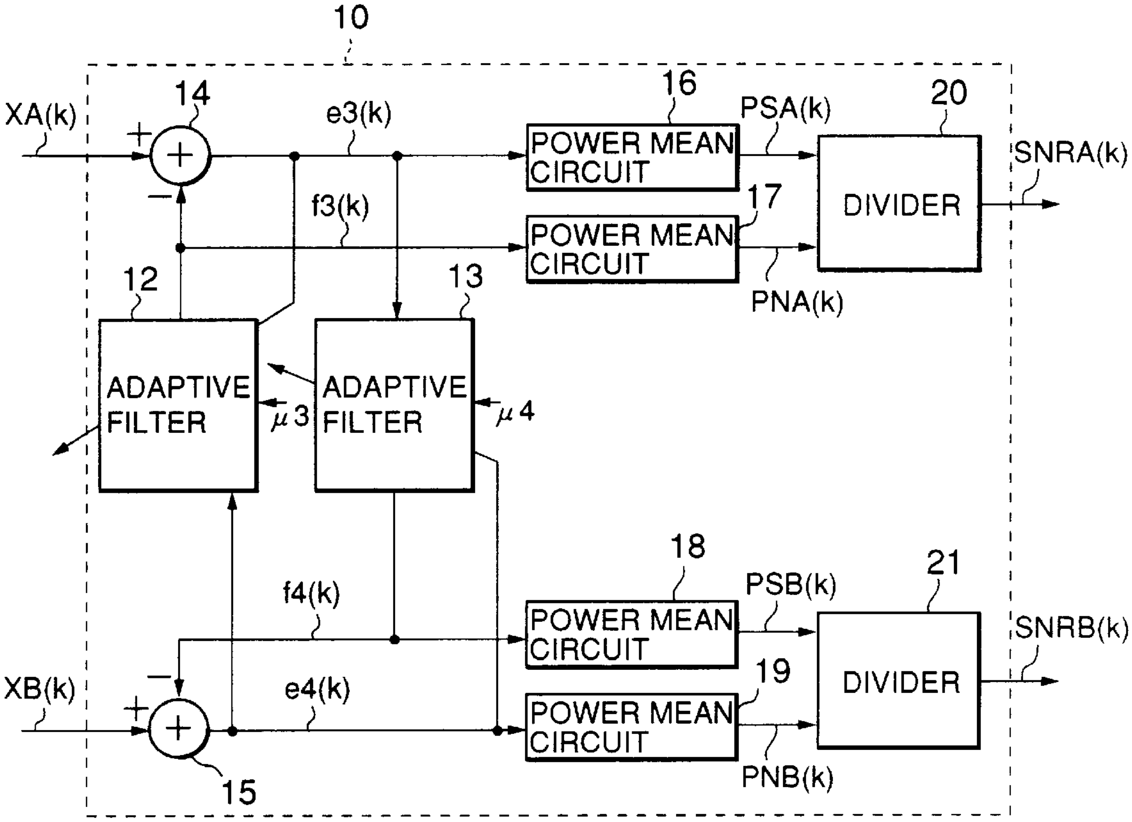
FIG. 2 is a block diagram schematically showing a signal-to-noise power ratio estimator included in the embodiment.

The operation of the signal-to-noise power ratio estimator 10 will be described hereinafter. As shown in FIG. 2, the estimator 10 is made up of adaptive filters 12 and 13 subtracters 14 and 15, power mean circuits 16, 17, 18 and 19, and dividers 20 and 21. The adaptive filters 12 and 13 and subtracters 14 and 15 are cross-coupled in exactly the same manner as in FIG. 1. The difference is that step sizes $\mu 3$ and $\mu 4$ assigned to the adaptive filters 12 and 13, respectively, each is fixed and great enough to promote convergence. For example, when the LIM scheme is used, the step sizes $\mu 3$ and $\mu 4$ are selected to be between about 0.2 and about 0.5. Such relatively great step sizes promote rapid convergence although they will increase the residual error.

Assume that the adaptive filters 12 and 13 both are converged. Then, the filter 12 produces an output f3(k) which is the noise signal contained in the main signal. The subtracter 14 produces an output e3(k) which is the desired signal also contained in the main signal. The power mean circuit 16 squares the output e3(k) of the subtracter 14 so as to determine its time mean and thereby outputs desired signal power PSA(k) particular to the main signal. The power mean circuit 17 squares the output f3(k) of the filter 12 so as to determine its time mean and thereby outputs noise signal power PNA(k) particular to the main signal.

The other filter 13 produces an output f4(k) which is the desired signal contained in the reference signal. The subtracter 15 produces an output e4(k) which is the noise signal also contained in the reference signal. The power mean circuit 19 squares the output e4(k) of the subtracter 15 so as to determine its time mean and thereby outputs noise signal power PNB(k) particular to the reference signal. Likewise, the power mean circuit squares the output f4(k) of the filter 13 so as to determine its time mean and thereby outputs desired signal power PSB(k) particular to the reference signal.

The divider 20 divides the desired signal power PSA(k) output from the power mean circuit 16 by the noise signal power PNA(K) output from the power mean circuit 17. As a result, an estimated signal-to-noise power ratio SNRA(k) of the main signal is output from the divider 20. Likewise, the divider 21 divides the desired signal power PSB(K) output from the power mean circuit 18 by the noise signal power pnb(K) output from the power mean circuit 19. As a result, an estimated signal-to-noise power ratio SNRB(k) of the reference signal is output from the divider 21.

When the averaging operation of the power mean circuits 16–19 is implemented by, e.g., the method of moving average, the calculated power mean values involve a delay of ΔAV dependent on the number of times of averaging with respect to the actual power variation. The illustrative embodiment includes the delay circuits 8 and 9, FIG. 1, in order to compensate for the above delay ΔAV. It is therefore desirable that the delay $Z^{-D}$ of the delay circuits 8 and 9 be equal to ΔAV.

With the above configuration, the signal-to-noise power ratio estimator 10 implements rapid convergence by providing the cross-coupled adaptive filters 12 and 13 with a relatively great step size. The estimator 10 outputs, by use of the converged signals, the estimated signal-to-noise power ratio SNRA(k) of the main signal and the estimated signal-to-noise power ratio SNRB(k) of the reference signal.

Figure 3:
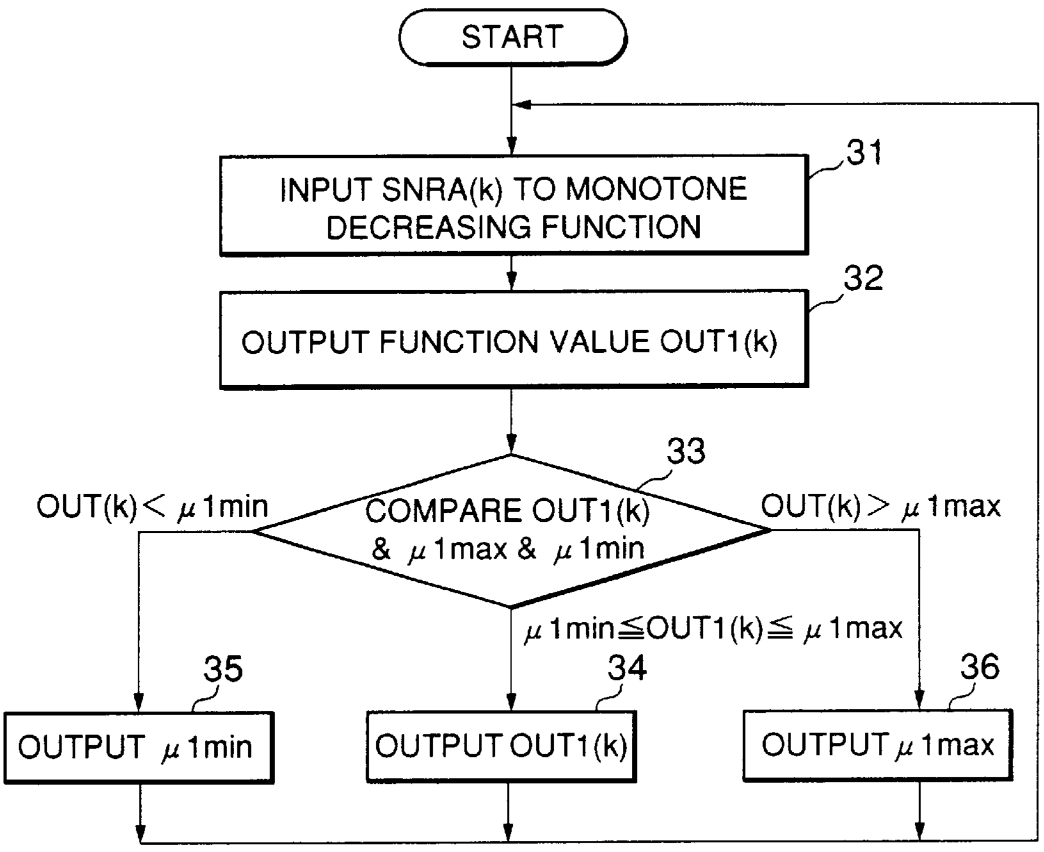
FIGS. 3 and 4 are flowcharts demonstrating the operation of a step size output circuit 11 also included in the embodiment.
Figure 4:
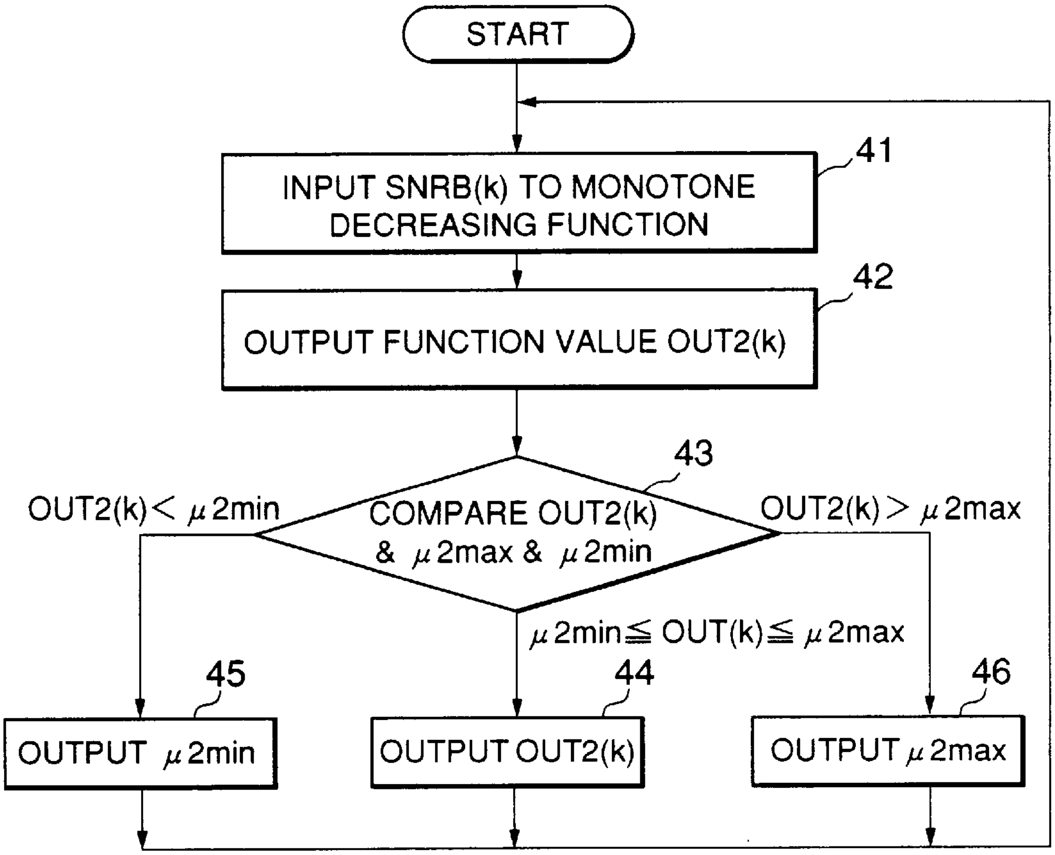

Reference will be made to FIGS. 3 and 4 for describing the operation of the step size output circuit 11. First, the estimated SNRA(k) of the main signal output from the signal-to-noise power ratio estimator 10 is input to a monotone decreasing function (step 31). Assuming that f() is the monotone decreasing function for SNRA(k), then the output OUT1(k) of the function is produced by (step 32):

$$OUT1(k) = f(SNRA(k)) \quad \text{Eq. (22)}$$

By use of the above value OUT1(k), the step size, $\mu 1(k)$ of the adaptive filter 3 is calculated as:

$$\mu 1(k) = \text{clip}[OUT1(k), \mu 1max, \mu 1lmin] \quad \text{Eq. (23)}$$

where clip[a, b, c] is a function for setting the maximum value and minimum value and defined as:

$$\text{clip}[a, b, c] = a(c \leqq a \leqq b)$$

$$\text{clip}[a, b, c] = b(a > b)$$

$$\text{clip}[a, b, c] = c(a < c) \quad \text{Eq. (24)}$$

Limiting the step size by use of the maximum value $\mu 1max$ and minimum value $\mu lmin$ is desirable for the stable operation of the adaptive filter. As for the adaptive filter 3 the function value determined by inputting the estimated signal-to-noise power ratio SNRA(k) to the monotone decreasing function is used as a step size, as stated above. It follows that the step size is reduced when the signal-to-noise power ratio is great, or it is increased when the ratio is small (steps 33–36).

The estimated signal-to-noise power ratio of the reference signal is also input to a monotone increasing function (step 41). Assuming that g() is the monotone decreasing function for SNRB (k), then the output OUT2(k) of the function is produced by (step 42):

$$OUT2(k) = g(SNR\ B(k)) \quad \text{Eq. (25)}$$

By use of the above value OUT2(k), the step size $\mu 2(k)$ of the adaptive filter 6 is calculated as:

$$\mu 2(k) = \text{clip}[OUT2(k), \mu 2max, \mu 2min] \quad \text{Eq. (26)}$$

As for the adaptive filter 6, the function value determined by inputting the estimated signal-to-noise power ratio SNRB (K) to the monotone decreasing function is used as a step size, as stated above. It follows that the step size is increased when the signal-to-noise power ratio is great, or it is decreased when the ratio is small (steps 43–46).

As described above, the step size output circuit 11 controls the step size to be fed to the adaptive filter 3 in accordance with the estimated signal-to-noise power ratio SNRA(k) of the main signal. Also, the circuit 11 controls the step size to be fed to the adaptive filter 6 in accordance with the estimated signal-to-noise power ratio SNRB(k) of the reference signal.

Alternatively, an arrangement may be made such that the step sizes $\mu 1(k)$ and $\mu 2(k)$ assigned to the adaptive filters 3 and 6, respectively, are compared, and smaller one of them is set to be zero in order to interrupt the learning function of the filter whose step size is determined to be zero. This kind of control successfully reduces interference between the two filters 3 and 6 and thereby promotes more accurate learning.

In summary, it will be seen that the present invention provides a noise canceler capable of estimating the noise signal of a main signal and the noise signal of a reference signal accurately. The noise canceler therefore insures rapid convergence and allows a minimum of signal distortion to occur without resorting to a command customarily input from the outside for commanding the learning operation of filters. These advantages are derived from a unique configuration in which a relation in size between a desired signal, which is an interference signal for an adaptive filter used to estimate the noise signal of the main signal from the estimated signal-to-noise power ratio of the main signal, and the noise signal to be canceled is determined. This relation is used to control a step size to be fed to the adaptive filter. This is also true with an adaptive filter for estimating the desired signal of the reference signal from the estimated signal-to-noise power ratio of the reference signal; the noise signal is an interference signal while the desired signal is a signal to be canceled.

Various modifications will become possible for those skilled in the art after receiving the teachings of the present disclosure without departing from the scope thereof.

What is claimed is:

1. A noise canceler comprising:

first delaying means for delaying a main signal containing a desired signal and a noise signal by a preselected period of time to thereby output a delayed main signal;

second delaying means for receiving the noise signal as a reference signal and delaying the reference singal by the preselected period of time to thereby output a delayed reference signal;

first subtracting means for subtracting a first estimated noise signal from said delayed main signal to thereby generate a first desired signal output;

second subtracting means for subtracting a first estimated desired signal from said delayed reference signal to thereby generate a first noise signal output;

a first adaptive filter for receiving said first noise signal output and adaptively estimating a noise signal contained in said delayed main signal to thereby output said first estimated noise signal;

a second adaptive filter for receiving said first desired signal output and adaptively estimating a desired signal contained in said delayed reference singal to thereby output said first estimated desired signal;

signal-to-noise power ratio estimating means for receiving said main signal and said reference signal and calculating desired signal power and noise signal power of the main signal and desired signal power and noise signal power of the reference signal to thereby output an estimated value of a power ratio of the main signal to the noise signal and an estimated value of a power ratio of the reference signal to the noise signal; and step size outputting means for receiving said estimated values from said signal-to-noise power ratio estimating means to thereby output a first and a second step size representative of an amount of correction of a filter coefficient of said first adaptive filter and an amount of correction of a filter coefficient of said second adaptive filter, respectively.

2. A noise canceler as claimed in claim 1, wherein said signal-to-noise power ratio estimating means comprises:

third subtracting means for subtracting a second estimated noise signal from the main signal to thereby generate a second desired signal output;

fourth subtracting means for subtracting a second estimated desired signal from the reference signal to thereby generate a second noise signal output;

a third adaptive filter for receiving said second noise signal output and adaptively estimating a noise signal contained in the main signal to thereby output said second estimated noise signal;

a fourth adaptive filter for receiving said second desired signal output and adaptively estimating a desired signal contained in the reference signal to thereby output a second estimated desired signal;

first power averaging means for receiving said second desired signal output and producing a square mean of said second desired signal output to thereby output desired signal power of the main signal;

second power averaging means for receiving said second estimated noise signal and producing a square mean of said second estimated noise signal to thereby output noise signal power of the main signal;

third power averaging means for receiving said second estimated desired signal and producing a square mean of said second estimated desired signal to thereby output desired signal power of the reference signal;

fourth power averaging means for receiving said second noise signal output and producing a square mean of said second noise signal to thereby output noise signal power of the reference signal;

first dividing means for dividing said desired signal power of the main signal by said noise signa power of the main signal to thereby output an estimated value of a power ratio of the main signal to the noise signla; and second dividing means for dividing said desired signal power of the reference signal by said noise signal power of the reference signal to thereby output an estimated value of a power ratio of the reference signal to the noise signal.

3. A noise canceler as claimed in claim 1, wherein said step size outputting means comprises:

means for inputting said estimated value of the power ratio of the main signal to the noise signal to a preselected monotonously increasing function to thereby calculate a first function value; and means for outputting as said first step size said first function value when said first function value is between a first maximum value and a first minimum value, or outputting said first maximum value when said first function value is greater than said first maximum value, or outputting said first minimum value when said first function value is smaller than said first minimum value.

4. A noise canceler as claimed in claim 1, wherein said step size outputting means comprises:

means for inputting said estimated value of the power ratio of the reference signal to the noise signal to a preselected monotonously increasing function to thereby calculate a second function value; and means for outputting as said second step size said second function value when said second function value is between a second maximum value and a second minimum value, or outputting said second maximum value when said second function value is greater than said second maximum value, or outputting said second minimum value when said second function value is smaller than said second minimum value.

5. A noise canceler as claimed in claim 1, wherein said step size outputting means comprises:

means for inputting said estimated value of the power ratio of the main signal to the noise signal to a preselected monotonously increasing function to thereby calculate a first function value;

means for outputting as said first step size said first function value when said first function value is between a first maximum value and a first minimum value, or outputting said first maximum value when said first function value is greater than said first maximum value, or outputting said first minimum value when said first function value is smaller than said first minimum value;

means for inputting said estimated value of the power ratio of the reference signal to the noise signal to a preselected monotonously increasing function to thereby calculate a second function value; and means for outputting as said second step size said second function value when said second function value is between a second maximum value and a second minimum value, or outputting said second maximum value when said second function value is greater than said second maximum value, or outputting said second minimum value when said second function value is smaller than said second minimum value.5;

wherein one of said first and second step sizes smaller than the other is set to be zero.

6. A noise cancler as claimed in claim 1, wherein the preselected period of time assigned to said first and second delaying means is equal to a delay ascribable to calculation of said estimated value of the power ratio of the main signal to the noise signal and said estimated value of the power ratio of the reference signal to the noise signal executed by said signal-to-noise power ratio estimating means.

* * * * *